(12) United States Patent
Kaiser et al.

(10) Patent No.: US 6,736,086 B2
(45) Date of Patent: May 18, 2004

(54) FOOD TEMPERATURE MEASURING DEVICE WITH AUDIBLE SIGNAL

(76) Inventors: Dolores Kaiser, 336 Golfview Rd., Apt. 1001, North Palm Beach, FL (US) 33408; Frederick Kaiser, 131 Bethel Rd., Albertson Long Island, NY (US) 11507

( * ) Notice: Subject to any disclaimer, the term of this patent is extended or adjusted under 35 U.S.C. 154(b) by 0 days.

(21) Appl. No.: 10/218,980

(22) Filed: Aug. 13, 2002

(65) Prior Publication Data

US 2003/0112845 A1 Jun. 19, 2003

Related U.S. Application Data

(63) Continuation-in-part of application No. 09/677,712, filed on Sep. 30, 2000, now Pat. No. 6,431,110.

(51) Int. Cl.$^7$ .................................................. G01K 1/02
(52) U.S. Cl. ........................ 116/216; 116/101; 116/221
(58) Field of Search ............................. 116/216, 101, 116/221, 148, 152, 114.5, DIG. 10; 375/142, 155

(56) References Cited

U.S. PATENT DOCUMENTS

| | | | |
|---|---|---|---|
| 1,918,258 A | | 9/1933 | Fredricksen |
| 3,373,611 A | | 3/1968 | Trott |
| 3,778,798 A | | 12/1973 | Heit |
| 3,830,191 A | | 8/1974 | Burke |
| 3,967,502 A | * | 7/1976 | Moran ........................ 116/216 |
| 4,058,013 A | * | 11/1977 | Trott ........................... 116/216 |
| 4,059,997 A | | 11/1977 | Trott |
| 4,082,000 A | * | 4/1978 | Volk ............................ 116/216 |
| 4,083,250 A | | 4/1978 | Goff et al. |
| 4,088,863 A | * | 5/1978 | Jellies ......................... 116/216 |
| 4,089,222 A | | 5/1978 | Perkins |
| 4,154,105 A | * | 5/1979 | Mackley ...................... 116/216 |
| 4,354,448 A | | 10/1982 | Lin |
| 4,503,800 A | | 3/1985 | Schliep |
| 4,748,931 A | | 6/1988 | Volk |
| 4,950,085 A | | 8/1990 | Horvath |
| 5,312,188 A | | 5/1994 | Ashe |
| 5,487,352 A | | 1/1996 | Williams et al. |
| 5,666,331 A | | 9/1997 | Kollin |
| 5,771,783 A | * | 6/1998 | Uss ............................. 116/121 |
| 5,988,102 A | * | 11/1999 | Volk et al. ................... 116/216 |
| 6,065,391 A | | 5/2000 | Archard et al. |
| 6,230,649 B1 | * | 5/2001 | Yeung ......................... 116/216 |
| RE37,988 E | * | 2/2003 | Uss ............................. 374/149 |

FOREIGN PATENT DOCUMENTS

WO          WO 90/11497        10/1990

* cited by examiner

*Primary Examiner*—Diego Gutierrez
*Assistant Examiner*—Travis Reis
(74) *Attorney, Agent, or Firm*—McHale & Slavin, P.A.

(57) ABSTRACT

The present invention is a temperature measuring device for insertion into food which audibly signals the user when the temperature of the food reaches a predetermined level. The stem of the device contains a coiled temperature sensitive bi-metallic spring. As the internal temperature of the substance increases, the temperature sensing material slowly rotates, causing a pointer and triggering disk to rotate. When the rotation achieves a predetermined position, a pre-wound coil spring is permitted to engage a drive gear which operates a hammer device so as to provide an audible signal. Thus, the user is audibly alerted when the internal temperature of the substance reaches the desired threshold level.

5 Claims, 6 Drawing Sheets

FOOD TEMPERATURE MEASURING DEVICE WITH AUDIBLE SIGNAL

RELATED APPLICATIONS

This application is a continuation-in-part of Ser. No. 09/677,712, filed Sep. 30, 2000, now U.S. Pat. No. 6,431,110, Aug. 13, 2002, the contents of which are herein incorporated by reference.

FIELD OF THE INVENTION

This invention relates generally to a temperature measuring device for use in cooking food, and particularly to a temperature measuring device having an audible alarm to alert the user when the temperature of the food reaches a predetermined threshold level.

BACKGROUND OF THE INVENTION

Various food products must be cooked until the internal temperature of the food reaches a predetermined temperature. This is especially true with respect to meat due to health purposes and personal preference. By achieving a certain internal temperature, the preparer can be reasonably certain that the food contains no living organisms which are known to have an immediate effect in many consumers. Also, the preparer can serve a dish that conforms to the personal preference of the consumer, i.e. rare, medium, or well-done without the need of cutting open the food to check or attempt to rely solely on time cooked.

Conventional food measuring devices, generally referred to as "thermometers" incorporate a sensing probe for insertion into the food. Thus, if a thermometer only indicates temperature, the food preparer must diligently check the thermometer to determine when the food has reached the desired temperature.

There exist various cooking thermometer type devices that provide an indicator, such as a pop-up element or color change, which indicate when a threshold temperature has been reached in accordance with a predetermined measurement. However, these devices are generally not adjustable or precisely accurate. Thus, the preparer must diligently check the indicator to determine when the indicator is activated.

Known prior art food visual thermometers include U.S. Pat. No. 4,059,997; U.S. Pat. No. 3,373,611; U.S. Pat. No. 5,312,188; U.S. Pat. No. 1,918,258; and Foreign Patent WO 90/11497.

U.S. Pat. No. 6,065,391 discloses an electronic chef's fork which displays the degree of doneness of food. However, it is not adjustable and gives no audible signal.

U.S. Pat. No. 5,487,352 and U.S. Pat. No. 4,748,931 disclose a pop-up temperature indicator. The devices have a meltable seal that melts at a set point causing a portion of the device to pop-up thus alerting the user that the food is done. Again, there is no audible signal.

U.S. Pat. No. 4,083,250 discloses a food thermometer with an audible device. On reaching a set point cooking temperature, a valve opens enabling steam in a reservoir to activate a whistle alarm. This device does provide an audible alarm but requires filling and projects a hot steam upon activation.

U.S. Pat. No. 3,778,798 discloses a food thermometer for producing an audible alarm but it is a sophisticated and complex unit generally only available as a permanent part of an oven.

U.S. Pat. No. 4,089,222 discloses a device for telemetry of the temperature of a mass undergoing temperature change, typically of a comestible being heated in an oven, and the like. The device includes a probe having a cavity which receives a thermally expansive material such as wax, a displacement member responsive to pressure developed by the temperature expansive material, a sonic or ultra-sonic signal generator, a latch mechanism inhibiting operation of the audio signal generator and a rod mechanically interconnecting the displacement member with the latch so that expansion of the material in the probe cavity trips the latch mechanism to permit generation of an output signal. The device also includes adjustment means for variation in the relative positions of the latch mechanism to the displaceable member whereby the triggering temperature for the latch mechanism can be fixedly adjusted.

U.S. Pat. No. 4,950,085 teaches a temperature sensing device having a gauge and a stem assemblies and utilizing a flexible coupling to transmit rotation through predetermined angles from a helical temperature sensitive element, to an indicator, further utilizing means to rotate the gauge assembly relative to the stem assembly. The gauge assembly includes a dial and the stem assembly includes the indicator, a stem, and the helical temperature sensitive element whereby rotation of the gauge assembly with respect to the stem assembly allows calibration of the dial to the indicator to reflect the appropriate temperature reading on the dial of the gauge assembly.

U.S. Pat. No. 4,354,448 relates to an improved gyro-type manually operated dynamo mechanism applied to appliances consuming limited momentary power. Energy is stored by stressing a spring which, when released, keeps in mechanical connection with a train of acceleration gears terminating in a relatively heavy flywheel when the stressed spring is released to resume its unstressed state, and disconnects therewith when the spring reaches unstressed condition and allow the flywheel to rotate freely, thereby enhancing the exploitation of the energy stored in the flywheel in the form of inertia to produce the requisite electricity to sound the buzzer.

U.S. Pat. No. 3,830,191 is directed towards a timer for various meats, including poultry, to audibly indicate when a meat has been cooked to a desired extent. The container is filled with a solution which creates steam, and upon escape of the steam an audible signal is produced which indicates completion of cooking.

U.S. Pat. No. 5,666,331 is directed toward an alarm clock which controls the supply of electrical power to a first outlet mounted on the clock housing and receiving a plug-in external electrical device to periodically change the state of the electrical device in response to an alarm time signal. A second controllable outlet is also mounted on the housing for receiving a second plug-in external electrical device. Selectable steady or pulse power is provided to the second outlet. A receiver detects power line carrier signals on the incoming electrical power lines generated by a remote device in response to the occurrence of a sound producing event or other signal. The receiver causes the clock to supply power to either or both outlets depending on the position of a function switch in response to a detected power line carrier signal. An audible sound generator provides an audible alarm tone in response to an alarm signal. Frequency and volume controls selectively vary the frequency and volume of the audible alarm tone. A test button activates the outlets and audible sound generators to test proper operation and desired settings of the alarm clock.

U.S. Pat. No. 4,503,800 teaches a metallic bell-type alarm device for indicating the need for refueling or otherwise adjusting the heat generated within a wood stove or the like. The device is mounted on or adjacent to a stove at a location where it can respond to heat fluctuations in the stove. It comprises a metallic casing and base plate having mounted therein a bimetallic spring having a free-riding clapper washer mounted thereon and a trigger rod that cooperate to sound a bell alarm when significant temperature changes cause the spring to react to change position and strike the metal casing to sound a bell alarm.

Thus, conventional thermometer devices used for cooking require the preparer to carefully and diligently check the device to prevent the food from becoming overcooked. Should the food preparer become distracted with other dishes, a phone call, etc. and forget to check the thermometer, reliance on conventional cooking thermometer devices may result in the food becoming overcooked and possibly inedible. Thus, what is needed is a means for audibly alerting the food preparer when the internal temperature of the food being cooked reaches a predetermined temperature.

SUMMARY OF THE INVENTION

The present invention is a food temperature indicating device having an audible signal that alerts the user when the temperature of the food reaches a predetermined threshold. In general, the instant invention is a temperature measuring device having a stem insertable into a suitable substance and a body with an audible alarm mechanism. The stem has an elongated sensing probe, a temperature sensitive material, and a spring. The body has a temperature disk, an audible alarm, and trigger mechanism to activate the alarm. The stem extends through the body and is in operative communication with the temperature disk by a pointer cap.

The user is provided with means to rotate the temperature disk to the desired temperature on the temperature set indicator. The probe houses a coiled spring made of temperature sensitive material in bi-metallic communication. As the temperature of the food increases, the temperature of the sensitive material of the spring rises. This causes the sensitive material to expand and uncoil, thereby providing temperature related motion to the pointer mechanism and other associated elements as will be later described. One end of the spring is anchored to the stem of the probe, and the other end is in mechanical communication with means for triggering, either directly or indirectly, audible signaling means, for example an alarm bell. As the internal temperature of the food increases, the temperature pointer rotates accordingly.

When the desired threshold temperature is reached, the triggering means provide for mechanical activation of the alarm mechanism. In a preferred embodiment, a follower wheel, which is in mechanical engagement with the bell hammer or clapper and, in a first position prevents the hammer's operation, rides along the periphery of a trigger disk, which is essentially a notched wheel containing a cutout portion. The assembly inclusive of the trigger disk and pointer mechanism, which assists in setting the threshold temperature and enabling instantaneous temperature readout, are in direct mechanical engagement with the coiled bimetallic spring, whereby rotation in direct response to temperature is accomplished so as to rotate the trigger disk to a desired point at which the follower wheel reaches the notched area of the trigger disk. As the follower wheel engages the cutout detent area, the hammer is released, and a pre-wound spring unwinds, thereby providing sufficient movement of the hammer to provide the requisite audible signal. As a result, the user is audibly alerted when the desired threshold temperature has been reached. The alarm can be then be turned off by increasing the set temperature which also reengages the rachet. The user can then provide additional winding of the spring, without removal of the probe, by rotating a top-mounted winding mechanism, which may be in the form of a turn-key or rotatable bezel.

Thus, it is an objective of the instant invention to provide an audible alarm for alerting the user when the temperature of a substance reaches a predetermined threshold level.

It is a further objective of the instant invention to provide a temperature measuring device with an audible alarm that does not require filling with water or an electrical connection for operation.

It is yet another objective of the instant invention to provide a temperature measuring device with an audible alarm that is adjustable and inexpensive.

It is a still further objective of the invention to provide a temperature measuring device with an audible alarm that is self-contained having no discharge.

It is a still further objective of the instant invention to provide a temperature measuring device whose threshold temperature setting can be adjusted without removal from the substance into which it is inserted.

It is yet an additional objective of the instant invention to provide winding means for the audible alarm of a temperature measuring device which can be operated while the device remains inserted within the substance being monitored.

It is an additional objective of the instant invention to provide supplemental anchoring and anti-rotation means to aid in maintaining the instant temperature sensing means in its originally chosen position.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Figure 1:
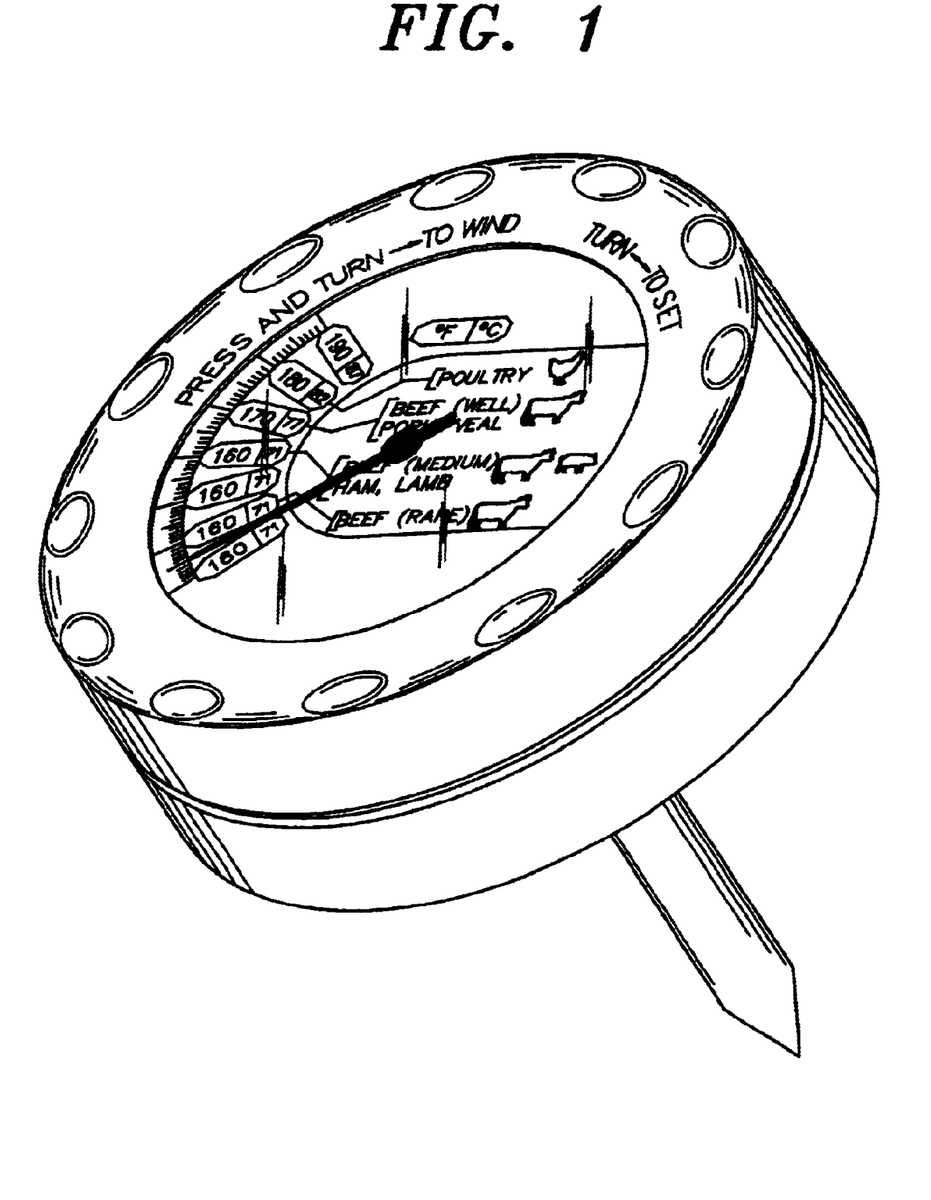
FIG. 1 is a pictorial view of a temperature measuring device having a rotatable bezel.
Figure 2:
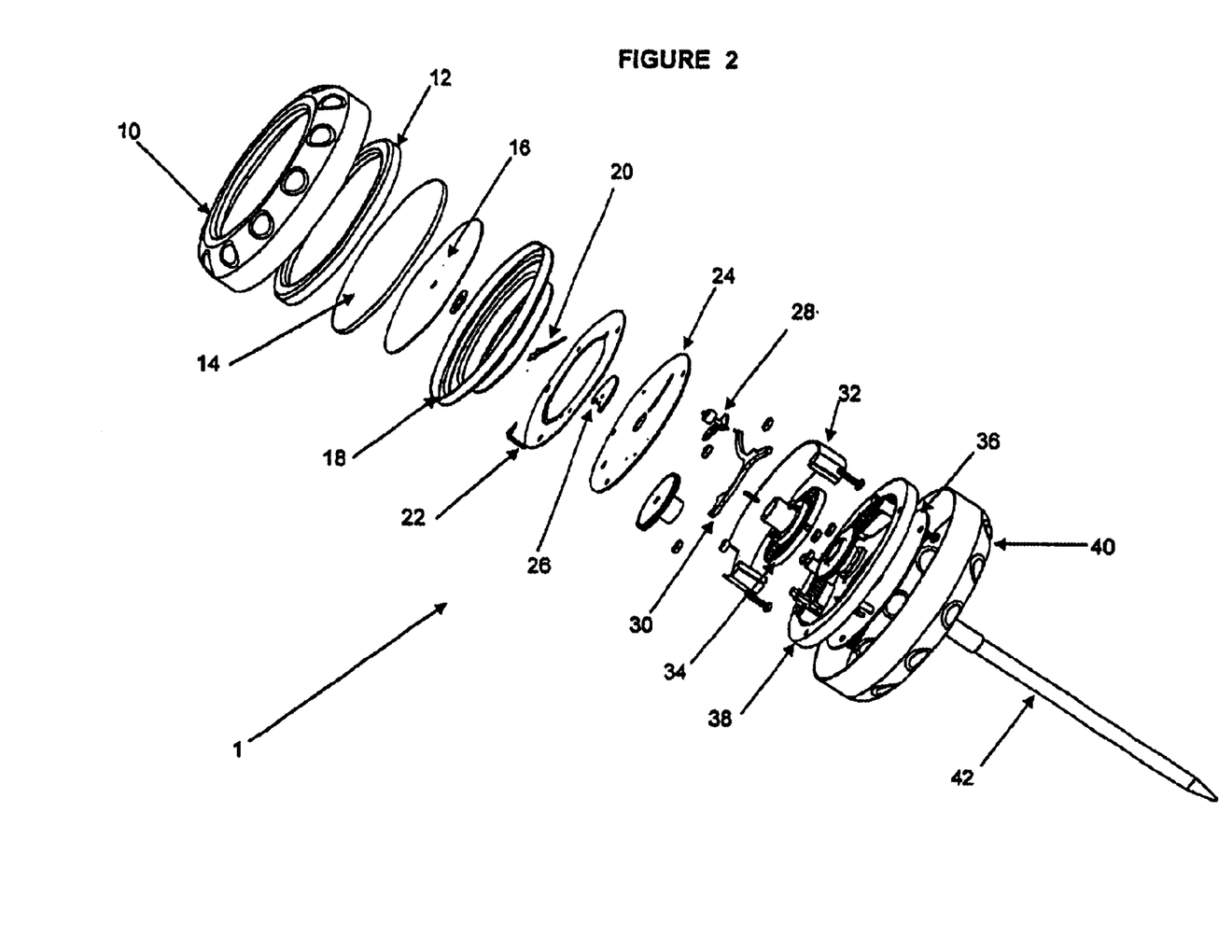
FIG. 2 represents an exploded view of the temperature measuring device of FIG. 1.
Figure 2A:
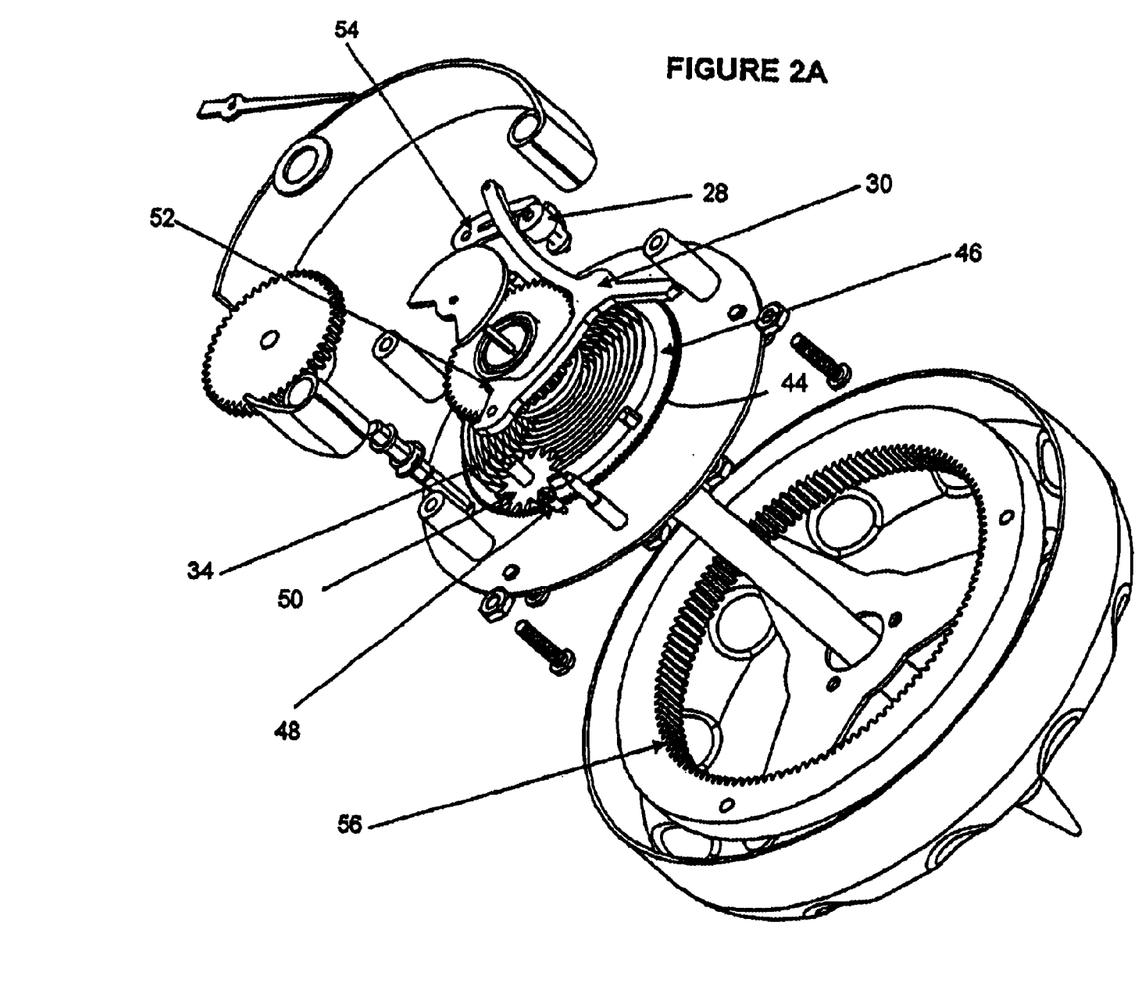
FIG. 2A represents an alternative exploded view of the device of FIG. 1.

Now referring to FIGS. 1, 2 and 2A, shown is the temperature measuring device with a body 1 comprising a top housing which operates as a rotatable bezel 10, housing connector 12, glass faceplate 14, dial face 16, dial support 18, indicator needle 20, set needle 22; top frame plate 24, trigger disk 26, follower wheel 28, bell hammer or clapper 30, protective shroud 32, bell spring 34, bottom frame plate 36, internal winding gear assembly 38, bell housing 40 and a skewer 42, within which is a coiled bimetallic spring which further engages a coaxially aligned central shaft or stem (not shown) which communicates with and mechanically links the indicator needle 20, and trigger disk 26. The skewer 42 is inserted into meats and placed in a rotisserie or the like. The bezel 10 is slid until the set needle 22 aligns with the desired temperature indicated upon the dial face 16. As the temperature increases the trigger disk 26 and indicator needle 20, rotate in response to the force exerted by the coiled bimetallic spring, and upon rotation of the trigger disk to a point wherein the cam follower engages the notched area, the hammer is released, allowing the audible signal to be generated.

As more particularly set forth in FIG. 2A, by turning the bezel 10, the spring 34 is wound in a first direction and maintained in a wound condition by interaction with a ratchet mechanism 44. This permits winding of the spring without unwanted movement of the hammer mechanism. The loaded spring is mechanically linked to a drive gear 46 which engages a first set of teeth (not shown) on the escapement gear 48 thereby preventing the spring from becoming unloaded. The escapement gear 48 has a second set of coaxially aligned but offset teeth 50 which alternately engage oscillation bearing surface 52 on the hammer mechanism. Upon engagement of the follower wheel 28 within the notched area of the trigger disk 26, the clevis 54 shifts position thereby enabling the hammer full freedom of motion. This freedom of motion permits the drive gear to rotate, which in turn rotates the escapement gear and enables oscillation of the hammer thereby generating an audible signal.

If desired the bezel 10 may be manipulated while still engaged within the substance that is being cooked to either alter the set point or alternatively to further wind the spring, for example in a circumstance wherein a further signal is desired at a later point in time when the substance has been either further heated or allowed to cool to a predetermined temperature.

Figure 3:
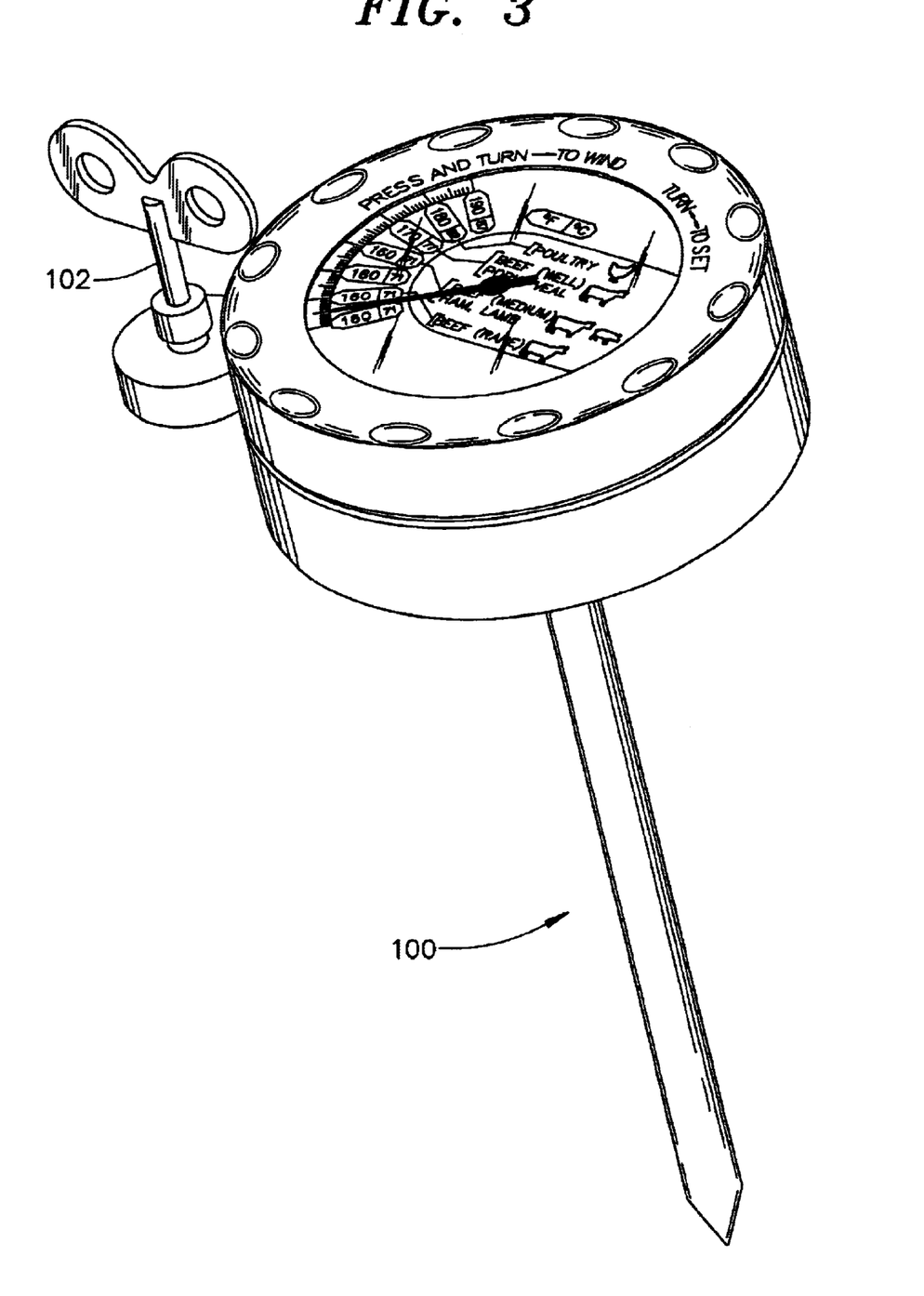
FIG. 3 is a pictorial view of an alternative embodiment of a temperature measuring device having a winder key.

Now referring to FIG. 3, a pictorial view of an alternative embodiment 100 is shown. In this embodiment, the winding mechanism is provided with a separate key 102, which is removable.

Figure 4A:
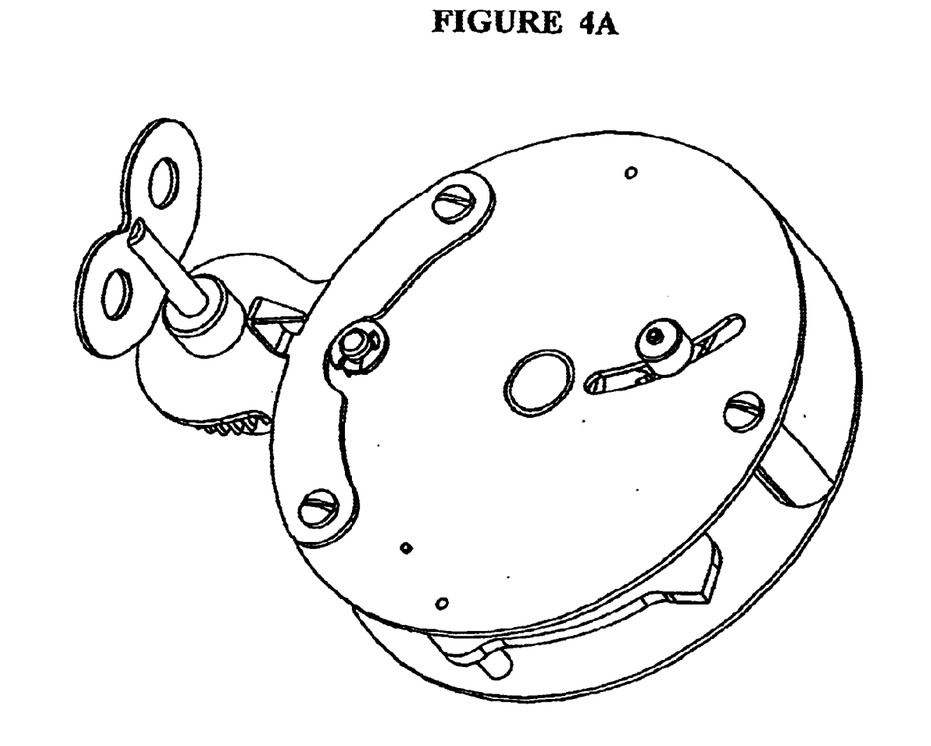
FIG. 4A is a pictorial view of the alarm motor of FIG. 3.

FIG. 4A is a pictorial view of the alarm motor assembly 400, showing the positioning of the winder key 102.

Figure 4B:
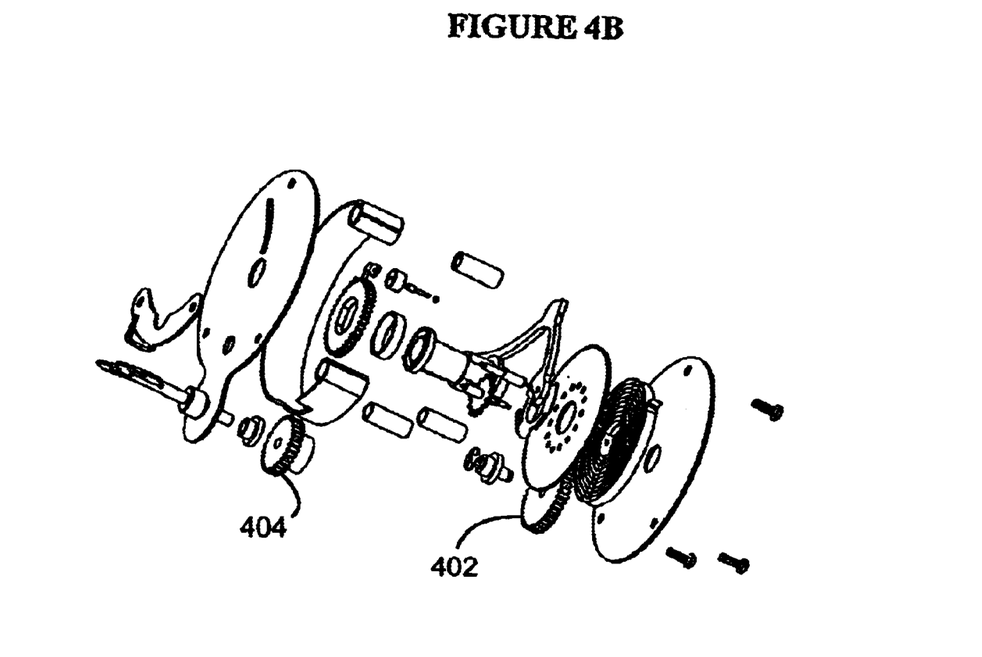
FIG. 4B is an exploded view of the alarm motor of FIG. 4B.

FIG. 4B is an exploded view of the alarm motor assembly which is essentially as shown in FIG. 2, with the exception that a first and second winder gear 402 and 404 cooperate to wind the spring in place of winder gear 56 in FIG. 2A.

Figure 5:
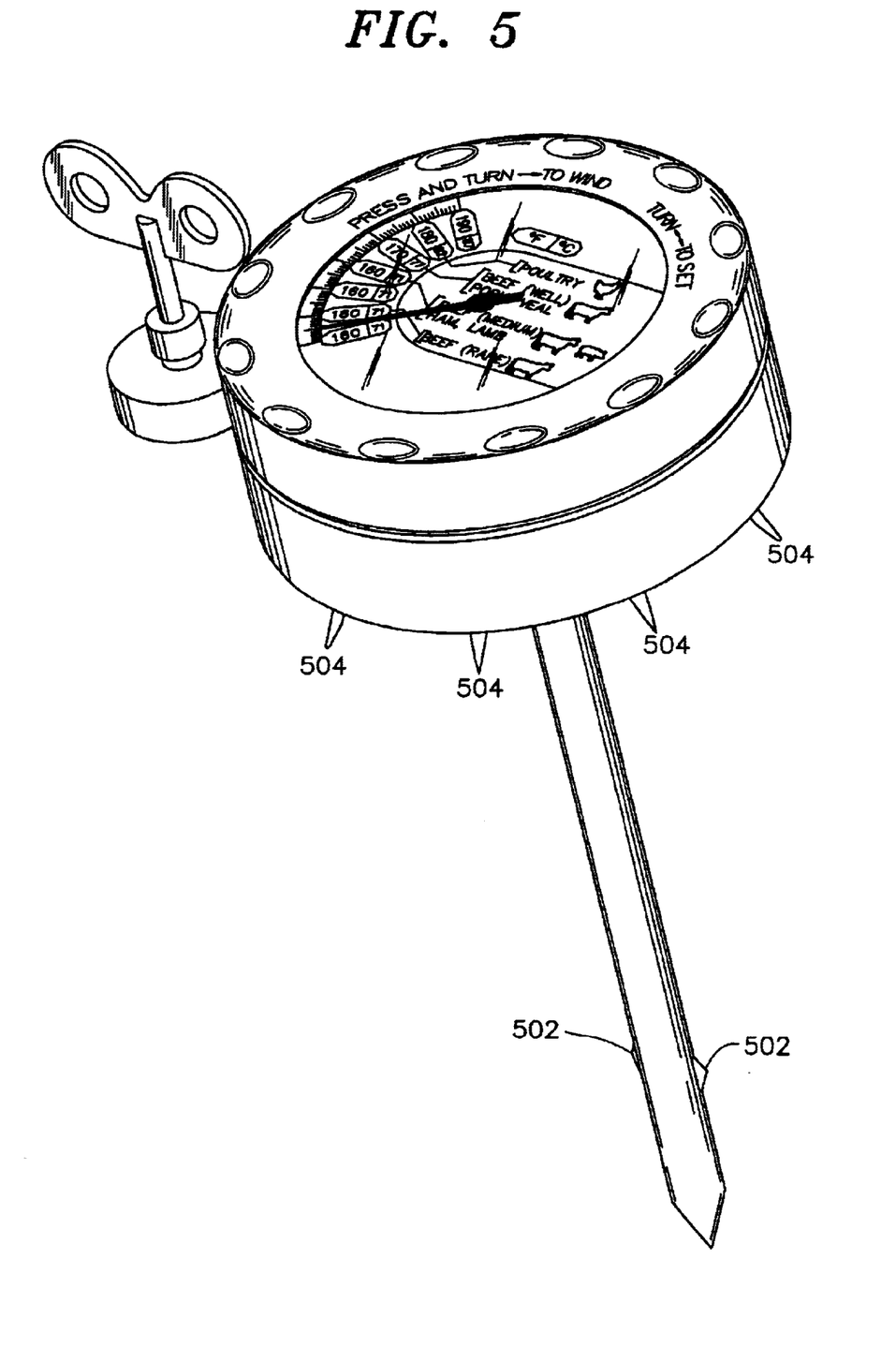
FIG. 5 is a pictorial view of the temperature measuring device of FIG. 3, inclusive of supplemental anchoring and anti-rotation means.

With reference to FIG. 5, a pictorial view essentially as set forth in FIG. 3 is shown inclusive of one or more additional anchorage enhancement elements which can include anchoring protrusions 502, plural anchoring barbs 504 or combinations thereof. While these improvements are shown in the FIG. 3 embodiment, it is understood that they are not so limited, and may be included in any of the illustrated embodiments or equivalents thereof. The protrusions 502 and barbs 504 serve to enhance the ability of the instant thermometer device to remain in position given the dynamics encountered during cooking, for example in a rotisserie.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, drawings, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An audible temperature measuring device for food, comprising:

a base having a top surface and a bottom surface, said top surface defining a cup shaped housing, said bottom surface having a temperature sensitive probe formed integral thereto and extending outwardly therefrom, said top surface including a rotatable bezel rotatable in first and second directions;

an integral audible alarm mechanism positioned within said housing, said alarm mechanism including a spring wherein said spring is manually windable by rotation of said rotatable bezel in the first direction;

a coil of temperature sensitive material disposed within said temperature sensitive probe operable to transmit rotational motion to a coaxially aligned shaft, said coil coupled to a temperature indicating means mounted on said shaft, said temperature indicating means movable over a temperature indicia plate;

a trigger mechanism coupled to said audible alarm mechanism operable to actuate said alarm; and a set temperature pointer manually positionable over said temperature indicia plate by rotation of said rotatable bezel in the second direction, said set temperature pointer operatively coupled to said trigger mechanism;

whereby a desired temperature is selected by moving said pointer over a temperature range when said probe inserted into a food substance and said audible alarm is activated upon the elevation of said food substance to a temperature approximate the desired temperature.

2. The device of claim 1 wherein said temperature sensing probe is an elongated tubular probe.

3. The device of claim 1 wherein said temperature sensitive coil is a coiled bi-metallic element.

4. The device of claim 2 wherein said probe includes at least one hook.

5. The device of claim 1 wherein said trigger mechanism includes a trigger disk coaxially mounted on said shaft, said trigger disk including an actuating notch; and an actuator in mechanical engagement with said audible alarm by operable to actuate said audible alarm by release of said spring; said actuator being in tangential engagement with said trigger disk wherein said alarm is actuated when said actuator engages with said actuating notch.

* * * * *